(12) United States Patent
Ishimoto et al.

(10) Patent No.: US 9,539,923 B2
(45) Date of Patent: Jan. 10, 2017

(54) HEADREST AND VEHICLE SEAT PROVIDED THEREWITH, AND METHOD OF MANUFACTURING HEADREST

(71) Applicant: TOYOTA JIDOSHA KABUSHIKI KAISHA, Toyota-shi, Aichi (JP)

(72) Inventors: Manabu Ishimoto, Chiryu (JP); Kouichiro Haga, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 44 days.

(21) Appl. No.: 14/427,850

(22) PCT Filed: Aug. 21, 2013

(86) PCT No.: PCT/JP2013/072329
§ 371 (c)(1),
(2) Date: Mar. 12, 2015

(87) PCT Pub. No.: WO2014/050377
PCT Pub. Date: Apr. 3, 2014

(65) Prior Publication Data
US 2015/0246628 A1    Sep. 3, 2015

(30) Foreign Application Priority Data

Sep. 25, 2012  (JP) ................................. 2012-211328

(51) Int. Cl.
*B60N 2/42* (2006.01)
*B60N 2/48* (2006.01)
(Continued)

(52) U.S. Cl.
CPC ......... *B60N 2/4808* (2013.01); *B29C 44/1238* (2013.01); *B29C 44/1271* (2013.01);
(Continued)

(58) Field of Classification Search
CPC ........... B60N 2/4808; B60N 2/48; B60N 2/64; B60N 2/682; B60N 2/7017; B60N 2/4885; B60N 2/42745; B29C 44/1238; B29C 44/1271; B29K 2075/00
(Continued)

(56) References Cited

U.S. PATENT DOCUMENTS 5,934,750 A * 8/1999 Fohl ..................... B60N 2/4844
                                                    297/216.12
6,033,018 A * 3/2000 Fohl ..................... B60N 2/2222
                                                    297/216.12
(Continued)

FOREIGN PATENT DOCUMENTS

JP      S60-151135 A    8/1985
JP      H10-226255 A    8/1998
(Continued)

*Primary Examiner* — Jose V Chen
(74) *Attorney, Agent, or Firm* — Oliff PLC

(57) ABSTRACT

It is obtained a headrest and a vehicle seat provided therewith and a method of manufacturing a headrest, that can reduce load to a neck portion of a vehicle occupant at a time of a rear collision while ensuring NV performance. A first urethane and a second urethane are disposed at an inner side of a headrest skin of a vehicle seat, and structure a headrest pad. The first urethane is embedded in the second urethane, and is elastically deformable, and supports a mass body. An elastic coefficient of the second urethane is set to be higher than that of the first urethane.

11 Claims, 8 Drawing Sheets

(51) Int. Cl.
    *B60N 2/68*     (2006.01)
    *B60N 2/70*     (2006.01)
    *B29C 44/12*     (2006.01)
    *B60N 2/64*     (2006.01)
    *B29K 75/00*     (2006.01)
    *B29K 105/04*     (2006.01)
    *B29L 9/00*     (2006.01)
    *B29L 31/30*     (2006.01)

(52) U.S. Cl.
    CPC ............... B60N 2/48 (2013.01); B60N 2/64 (2013.01); B60N 2/682 (2013.01); B60N 2/7017 (2013.01); *B29K 2075/00* (2013.01); *B29K 2105/04* (2013.01); *B29L 2009/00* (2013.01); *B29L 2031/3023* (2013.01)

(58) Field of Classification Search
    USPC ....................................................... 297/216.12
    See application file for complete search history.

(56) References Cited

U.S. PATENT DOCUMENTS

| | | | | |
|---|---|---|---|---|
| 6,805,404 B1 * | 10/2004 | Breed | ............... | B60N 2/002 280/730.1 |
| 6,863,343 B2 * | 3/2005 | Pal | ............... | B60N 2/4864 297/216.12 |
| 8,562,072 B2 * | 10/2013 | Ishimoto | ............... | B60N 2/4228 297/216.12 |
| 8,590,966 B2 * | 11/2013 | Gaines | ............... | B60N 2/4808 297/216.1 |
| 2003/0122409 A1 * | 7/2003 | Pal | ............... | B60N 2/4852 297/216.12 |
| 2005/0264052 A1 * | 12/2005 | Dellanno | ............... | B60N 2/42709 297/216.12 |
| 2007/0096515 A1 * | 5/2007 | Jammalamadaka | . | B60N 2/4855 297/216.12 |
| 2007/0246979 A1 * | 10/2007 | Browne | ............... | A47C 7/38 297/216.12 |
| 2010/0109396 A1 * | 5/2010 | Vitali | ............... | B60N 2/4808 297/216.12 |
| 2010/0127541 A1 * | 5/2010 | Kotz | ............... | B60N 2/4864 297/216.12 |
| 2012/0086255 A1 | 4/2012 | Ishimoto et al. | | |
| 2012/0098316 A1 | 4/2012 | Matsushima et al. | | |
| 2013/0127222 A1 | 5/2013 | Ishimoto et al. | | |
| 2015/0306997 A1 * | 10/2015 | Nasu | ............... | B60N 2/48 297/216.12 |

FOREIGN PATENT DOCUMENTS

| | | |
|---|---|---|
| JP | 2001-161489 A | 6/2001 |
| JP | 2006-321325 A | 11/2006 |
| JP | 2010-194246 A | 9/2010 |
| JP | 2010-201848 A | 9/2010 |
| JP | 2011-253791 A | 12/2011 |
| JP | 2012-086715 A | 5/2012 |
| JP | 2013-107491 A | 6/2013 |
| WO | 2010-150373 A1 | 12/2010 |
| WO | 2012-017539 A1 | 2/2012 |

* cited by examiner

HEADREST AND VEHICLE SEAT PROVIDED THEREWITH, AND METHOD OF MANUFACTURING HEADREST

TECHNICAL FIELD

The present invention relates to a headrest and a vehicle seat provided therewith, and to a method of manufacturing a headrest.

BACKGROUND ART

A vehicle seat in which a dynamic damper is structured by integrally supporting a mass body within a pad is disclosed in following Patent Document 1. Further, a headrest in which a dynamic damper is structured by providing an elastic resin material that is injected into a molding bag and foam-molded and a weight that is fixedly placed with respect to the molding bag, is disclosed in following Patent Document 2. In these prior art, because vibrations are damped by the dynamic damper, the NV performance (noise and vibration performance) can be improved.

PRIOR ART DOCUMENTS

Patent Documents

Patent Document 1: Japanese Patent Application Laid-Open No. 2001-161489
Patent Document 2: Japanese Patent Application Laid-Open No. 2010-194246

SUMMARY OF INVENTION

Technical Problem

However, these prior art do not disclose the point of reducing load to the neck portion of a vehicle occupant at the time of a rear collision (hereinafter called "at the time of a rear collision"), and there is room for improvement with regard to this point.

In consideration of the above-described circumstances, an object of the present invention is to provide a headrest and a vehicle seat provided therewith and a method for manufacturing a headrest, that can reduce load to the neck portion of a vehicle occupant at the time of a rear collision while ensuring the NV performance.

Solution to Problem

A headrest relating to a first aspect of the present invention comprises: a headrest stay that has leg portions that are supported at a seat back and that extend in a seat height direction; a first cushion material that is disposed at an inner side of a headrest skin, that supports a mass body and is formed of an elastically deformable urethane, and that is fixed to the headrest stay by adhesive force of the urethane itself; and a second cushion material that is disposed at the inner side of the headrest skin, and that structures a headrest pad together with the first cushion material, and that is formed of a urethane having a higher elastic coefficient than the first cushion material.

In accordance with the above-described structure, at the inner side of the headrest skin of the vehicle seat, the mass body is supported by the first cushion material that is elastically deformable. Namely, a dynamic damper that has the first cushion material and the mass body is structured. Therefore, seat vibrations are suppressed by setting the frequency characteristic of the dynamic damper such that the dynamic damper works in the frequency band of the seat vibrations for which suppression is desired.

Further, the second cushion material, that, together with the first cushion material, structures the headrest pad, is disposed at the inner side of the headrest skin. The elastic coefficient of this second cushion material is set to be higher than that of the first cushion material. Therefore, at the time of a rear collision, owing to the second cushion material, the supporting rigidity of the headrest with respect to the head portion of the vehicle occupant is increased, and the amplitude of the mass body also is suppressed. Further, due to the latter, load to the neck portion of the vehicle occupant, that is caused by vibration of the mass body in the seat longitudinal direction, is reduced.

Further, the first cushion material and the second cushion material are formed by urethane, and there is a structure in which the first cushion material is fixed to the headrest stay by the adhesive force of the urethane itself. Therefore, fastening by bolts, and the like are not needed in the setting of the mass body, and manufacturing is easy.

In a second aspect of the present invention, in the headrest relating to the first aspect, the first cushion material has a first overlap portion that is set at a position that overlaps the mass body as seen in a seat front view, and the second cushion material has a second overlap portion that is set at a position that overlaps the mass body and the first overlap portion as seen in a seat front view.

In accordance with the above-described structure, in a case in which the headrest vibrates in the seat longitudinal direction at the time when the seat vibrates usually, the mass body is displaced while elastically deforming the first overlap portion, and damps vibrations. On the other hand, in a case in which the mass body starts to vibrate in the seat longitudinal direction at an amplitude that is greater than or equal to the amplitude at the time when the seat vibrates usually, the second overlap portion suppresses vibration of the mass body. Due thereto, at the time of a rear collision, the amplitude of the mass body in the seat longitudinal direction is suppressed effectively, and therefore, load to the neck portion of the vehicle occupant, that is caused by vibration of the mass body in the seat longitudinal direction, is effectively reduced.

In a third aspect of the present invention, in the headrest relating to the first aspect or the second aspect, the first cushion material covers an entire periphery of a peripheral edge of the mass body.

In accordance with the above-described structure, the first cushion material covers the entire periphery of the peripheral edge of the mass body. Therefore, setting of the frequency characteristic of the dynamic damper is easy as compared with, for example, a structure in which the mass body is covered by the first cushion material and the second cushion material. Namely, seat vibrations are suppressed by setting the frequency characteristic of the dynamic damper by adjusting the mass of the mass body or the rigidity, volume, shape or the like of the first cushion material, such that the dynamic damper works in the frequency band of the seat vibrations for which suppression is desired.

In a fourth aspect of the present invention, in the headrest relating to any one aspect of the first aspect through the third aspect, the first cushion material is embedded in the second cushion material.

In accordance with the above-described structure, the second cushion material structures the outer peripheral portion of the headrest pad. Therefore, at the time of a rear collision, deformation of the outer shape of the headrest pad is suppressed, and the head portion of the vehicle occupant is supported by the second cushion material whose elastic coefficient is high. Due thereto, the supporting rigidity of the headrest with respect to the head portion of the vehicle occupant is increased.

In a fifth aspect of the present invention, in the headrest relating to any one aspect of the first aspect through the fourth aspect, a volume of the second cushion material is set to be greater than a volume of the first cushion material.

In accordance with the above-described structure, the volume of the second cushion material is greater than the volume of the first cushion material. Therefore, at the time of a rear collision, the supporting rigidity of the headrest with respect to the head portion of the vehicle occupant is increased, as compared with a case in which the volume of the second cushion material is less than the volume of the first cushion material.

In a sixth aspect of the present invention, in the headrest relating to any one aspect of the first aspect through the fifth aspect, the leg portions are provided as a left/right pair at the headrest stay, and the mass body is disposed between the pair of left and right leg portions, and is set at a position that overlaps the pair of left and right leg portions as seen in a seat side view.

In accordance with the above-described structure, the mass body is disposed between the pair of left and right leg portions of the headrest stay, and is set at a position that overlaps the pair of left and right leg portions as seen in a seat side view. Therefore, at the time of a side collision (hereinafter called "at the time of a side collision"), displacement of the mass body in the seat transverse direction is suppressed.

In a seventh aspect of the present invention, in the headrest relating to any one aspect of the first aspect through the sixth aspect, a plurality of the mass bodies are disposed.

In accordance with the above-described structure, because plural mass bodies are disposed, the mass per each mass body can be made to be small. Due thereto, at the time of a rear collision, the amplitudes of the respective mass bodies in the seat longitudinal direction are suppressed due to the lowering of the inertial forces of the respective mass bodies. Accordingly, load to the neck portion of the vehicle occupant, that is caused by vibration of the mass bodies in the seat longitudinal direction, is reduced.

In an eighth aspect of the present invention, in the headrest relating to the seventh aspect, respective resonance frequencies of the mass bodies that are supported by the first cushion material differ.

In accordance with the above-described structure, because the respective resonance frequencies of the mass bodies that are supported by the first cushion material differ, the frequency band of seat vibrations that can be suppressed can be broadened.

In a ninth aspect of the present invention, in the headrest relating to the seventh aspect or the eighth aspect, the mass bodies are disposed so as to be lined-up apart at left and right both sides in a seat transverse direction with respect to a seat transverse direction central line at the headrest.

In accordance with the above-described structure, the mass bodies are disposed so as to be lined-up apart at left and right both sides in the seat transverse direction with respect to the seat transverse direction central line at the headrest. Therefore, at the time of a rear collision, when the head portion of the vehicle occupant is pushed-against the headrest and is displaced toward between the left and right mass bodies, the mass bodies can be displaced toward the seat transverse direction outer sides.

A vehicle seat relating to a tenth aspect of the present invention comprises: a seat cushion on which a vehicle occupant sits; a seat back that is supported at a rear end portion of the seat cushion; and the headrest relating to any one aspect of the first aspect through the ninth aspect that is disposed at an upper end portion of the seat back and supports a head portion of the vehicle occupant.

In accordance with the above-described structure, the operation of the headrest relating to the first aspect of the present invention is obtained in the vehicle seat.

A method of manufacturing a headrest relating to an eleventh aspect of the present invention comprises: a first step of setting a mass body between a pair of leg portions of a headrest stay; a second step of, after the first step, by supplying and foam-molding urethane, that is a raw material of a first cushion material, at an outer peripheral side of the mass body, connecting the mass body and regions at mass body sides of the leg portions, by the first cushion material; a third step of, after the second step, inserting the headrest stay into an interior of a headrest skin that is bag-shaped, and placing the first cushion material and the mass body in the interior of the headrest skin; and a fourth step of, after the third step, by injecting and foam-molding urethane, that is a raw material of a second cushion material whose elastic coefficient is set to be higher than that of the first cushion material, in the interior of the headrest skin, forming a headrest pad by the first cushion material and the second cushion material.

In accordance with the above-described structure, in the first step, the mass body is set between a pair of leg portions of a headrest stay. In the second step that is after the first step, by supplying and foam-molding urethane, that is the raw material of the first cushion material, at the outer peripheral side of the mass body, the mass body and regions at the mass body sides of the leg portions are connected by the first cushion material. In the third step that is after the second step, the headrest stay is inserted into the interior of a headrest skin that is bag-shaped, and the first cushion material and the mass body are placed in the interior of the headrest skin. In the fourth step that is after the third step, by injecting and foam-molding urethane, that is the raw material of a second cushion material whose elastic coefficient is set to be higher than that of the first cushion material, in the interior of the headrest skin, the headrest pad is formed by the first cushion material and the second cushion material. In this way, the mass body is fixed to the leg portions by the first cushion material in the second step that is a first foaming step. Therefore, in the fourth step that is the second foaming step, the mass body can be held at the position where it was intended to be placed, without separately using a mounting tool for mounting the mass body to the leg portions. Further, the headrest relating to the first aspect of the present invention can be manufactured by such a method.

Advantageous Effects of Invention

As described above, in accordance with the present invention, there is the excellent effect of being able to reduce load to the neck portion of a vehicle occupant at the time of a rear collision, while ensuring the NV performance.

DESCRIPTION OF EMBODIMENTS

First Embodiment

Figure 1:
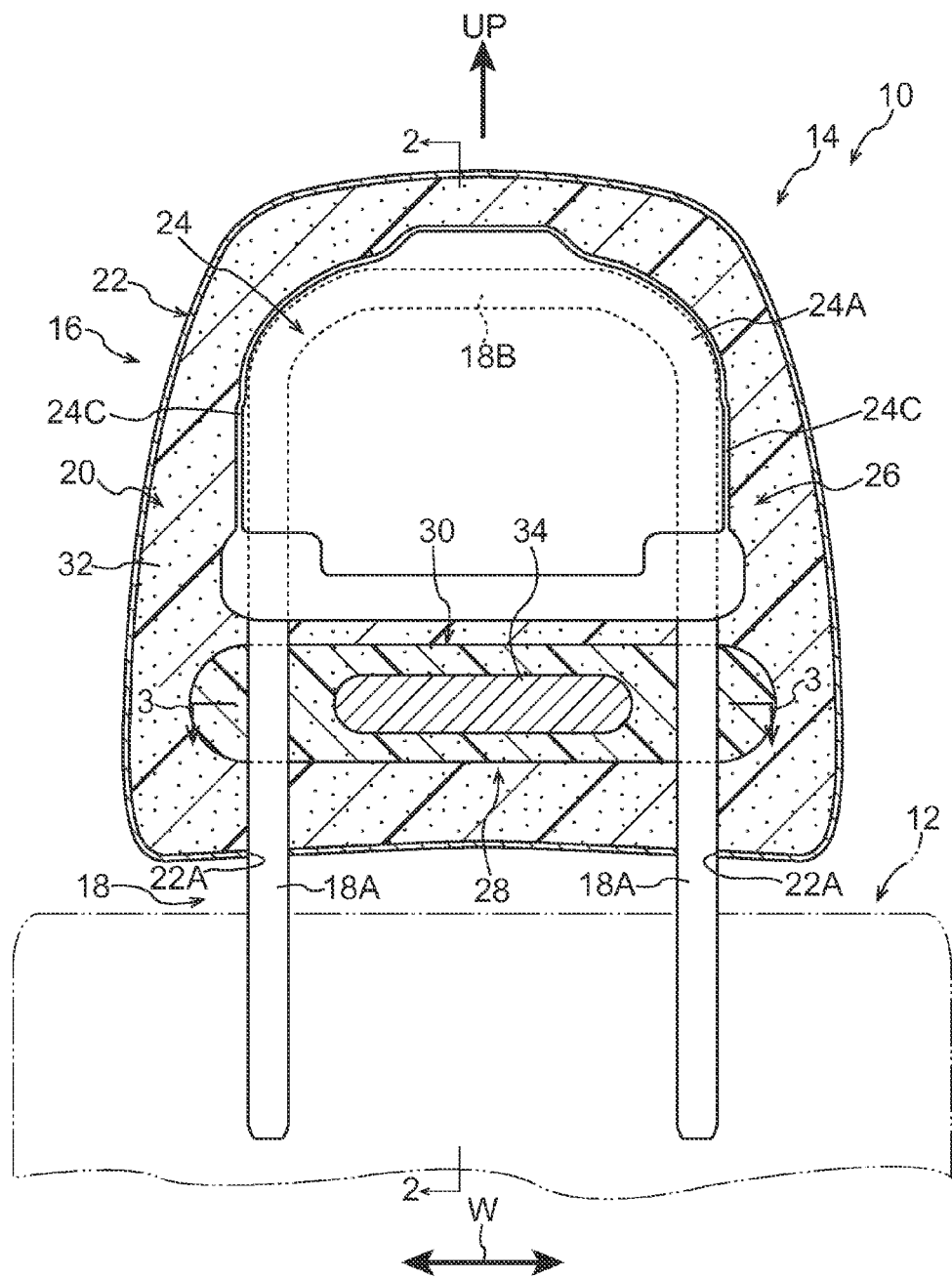
FIG. 1 is a cross-sectional view that is seen from the front of a seat and that shows a headrest of a vehicle seat relating to a first embodiment (a drawing that, at an upper portion of the headrest, is cut at a front surface position of a resin cover, and, at a lower portion of the headrest, is cut at front surface positions of leg portions of a headrest stay).

A first embodiment of the present invention is described by using FIG. 1 through FIG. 4. Note that arrow FR that is shown appropriately in these drawings indicates the vehicle front side, arrow UP indicates the vehicle upper side, and arrow W indicates the vehicle transverse direction. Further, in the drawings, the vehicle longitudinal direction and the seat longitudinal direction are the same direction, the vehicle vertical direction and the seat vertical direction are the same direction, and the vehicle transverse direction and the seat transverse direction are the same direction.

Figure 2:
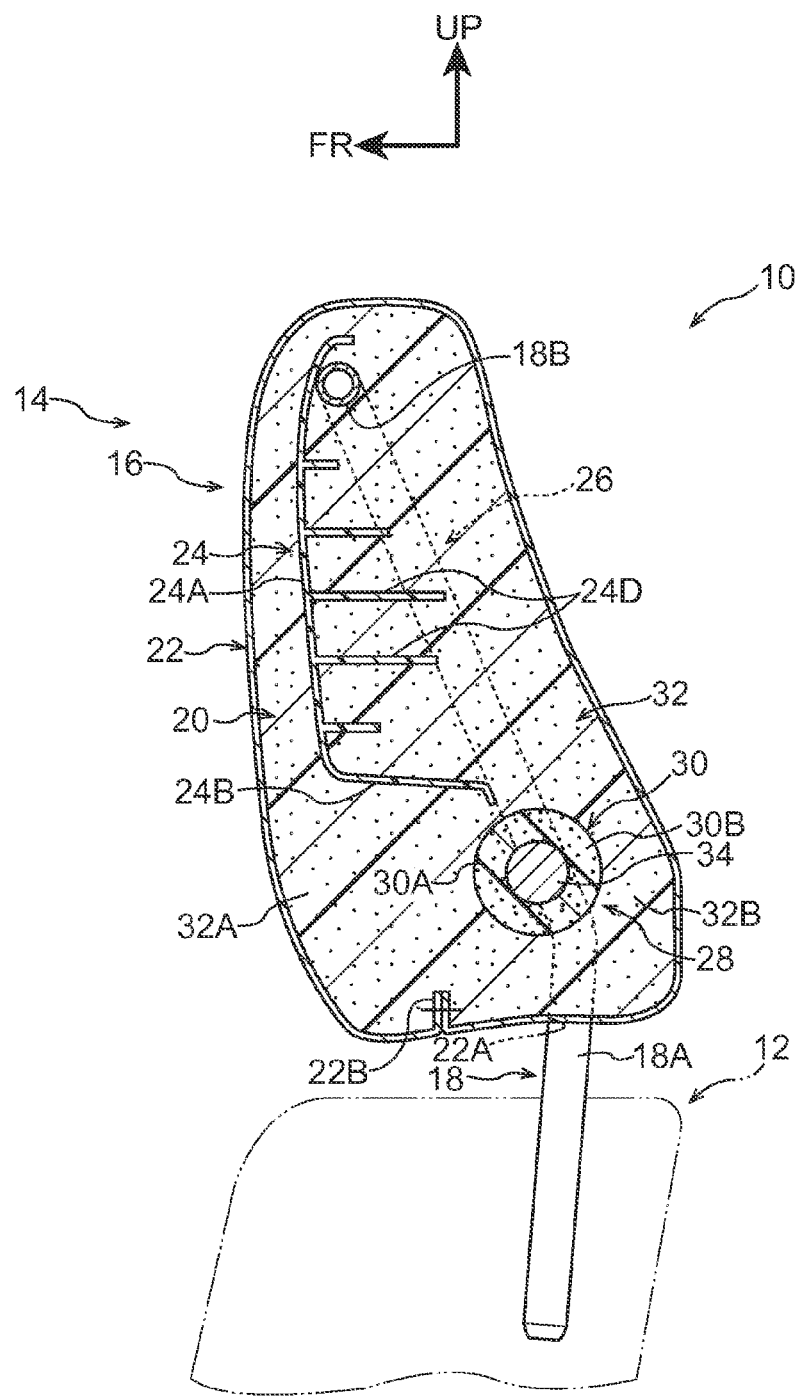
FIG. 2 is a cross-sectional view along line 2-2 of FIG. 1.

A headrest of a vehicle seat relating to the present embodiment is shown in FIG. 1 in a cross-sectional view that is seen from the front of the seat, and a cross-sectional view along line 2-2 of FIG. 1 is shown in FIG. 2. A vehicle seat 10 shown in these drawings has an unillustrated seat cushion that is mounted in an automobile and on which a vehicle occupant sits. A seat back 12 is reclinably supported at the rear end portion of the seat cushion. Note that, in FIG. 1 and FIG. 2, only the upper end portion of the seat back 12 is shown by the two-dot chain line. A headrest 14 that supports the head portion of the vehicle occupant is disposed at the upper end portion of the seat back 12.

The headrest 14 is structured to include a headrest main body 16 that is shaped as a pillow and supports the head portion of the vehicle occupant, and a headrest stay 18 that extends toward the vehicle lower side from the bottom surface of this headrest main body 16.

The headrest stay 18 is a structure in which a pipe made of metal is formed into an upside-down U-shape, and has a pair of left and right leg portions 18A. The pair of left and right leg portions 18A are supported at the seat back 12 by being inserted into an unillustrated headrest support of the seat back 12. Due thereto, the headrest 14 is supported at the seat back 12. The leg portions 18A extend in the seat height direction, and the upper portion sides thereof are disposed within the headrest main body 16. Further, the regions, that are disposed at the interior of the headrest main body 16, of the leg portions 18A have curved portions at the lower end portions thereof, and the regions, that are further toward the seat upper side than these curved portions, are inclined slightly forward toward the seat front side. Further, the upper ends of the leg portions 18A are connected in the seat transverse direction by a connecting portion 18B.

The headrest main body 16 has a headrest pad 20 that structures the cushion portion of the headrest main body 16, a headrest skin (cover) 22 that covers the headrest pad 20, and a resin cover 24 that is embedded within the headrest pad 20. Stay insert-through holes 22A, that are for the leg portions 18A of the headrest stay 18 to be inserted therethrough, are formed in the lower end portion of the headrest skin 22. As shown in FIG. 2, the seat front side of the stay insert-through holes 22A is a sewn-together portion 22B.

The resin cover 24 (also called "resin pad", "insert") is disposed at the upper portion side and the seat front side of the headrest stay 18. This resin cover 24 has a front wall 24A whose obverse faces toward the seat front side. A bottom wall 24B that extends toward the seat rear side is formed from the lower end portion of the front wall 24A. Further, side walls 24C (see FIG. 1) that extend toward the seat rear side are formed from the end portions at the seat transverse direction both sides of the front wall 24A.

Further, although detailed illustration thereof is omitted, an anchor portion that is anchored on the headrest stay 18 is formed at the resin cover 24. Moreover, plural ribs 24D that extend in the seat transverse direction, and plural ribs (not illustrated) that extend in the seat vertical direction, are formed at the surface, that faces toward the seat rear side, of the front wall 24A.

The headrest pad 20 that is shown in FIG. 1 and FIG. 2 has a first urethane 30 (a "spring element" in the broad sense) that serves as a first cushion material and is elastically deformable, and a second urethane 32 that serves as a second cushion material and whose elastic coefficient is higher (the second urethane 32 is harder) than the first urethane 30. Both the first urethane 30 and the second urethane 32 are disposed at the inner side of the headrest skin 22, and are formed by foam-molding urethane. Further, in the present embodiment, the first urethane 30 (inner side foamed urethane) is embedded in the second urethane 32 (outer side foamed urethane).

As shown in FIG. 1, the first urethane 30 is disposed at the seat lower side of the resin cover 24, and the seat transverse direction is the length direction thereof, and both end portions in the seat transverse direction of the first urethane 30 are fixed, by the adhesive force of the urethane itself, to the leg portions 18A of the headrest stay 18. Namely, the first urethane 30 spans between the pair of left and right leg portions 18A of the headrest stay 18.

A mass body 34 is embedded in the length direction intermediate portion of the first urethane 30. Namely, the peripheral edge of the mass body 34 is covered, over the entire periphery thereof, by the first urethane 30, and the mass body 34 is supported by the first urethane 30. Further, in the present embodiment, the peripheral edge of the mass body 34 is, over the entire periphery (the entire region) thereof, joined to the first urethane 30. The first urethane 30 has a pair of front and rear first overlap portions 30A, 30B (see FIG. 1) that are set at positions overlapping the mass body 34 as seen in a seat front view. In FIG. 2, among the pair of front and rear first overlap portions 30A, 30B, the first overlap portion that is set at the seat front side with respect to the mass body 34 is indicated by reference numeral 30A, and the first overlap portion that is set at the seat rear side with respect to the mass body 34 is indicated by reference numeral 30B.

Figure 3:
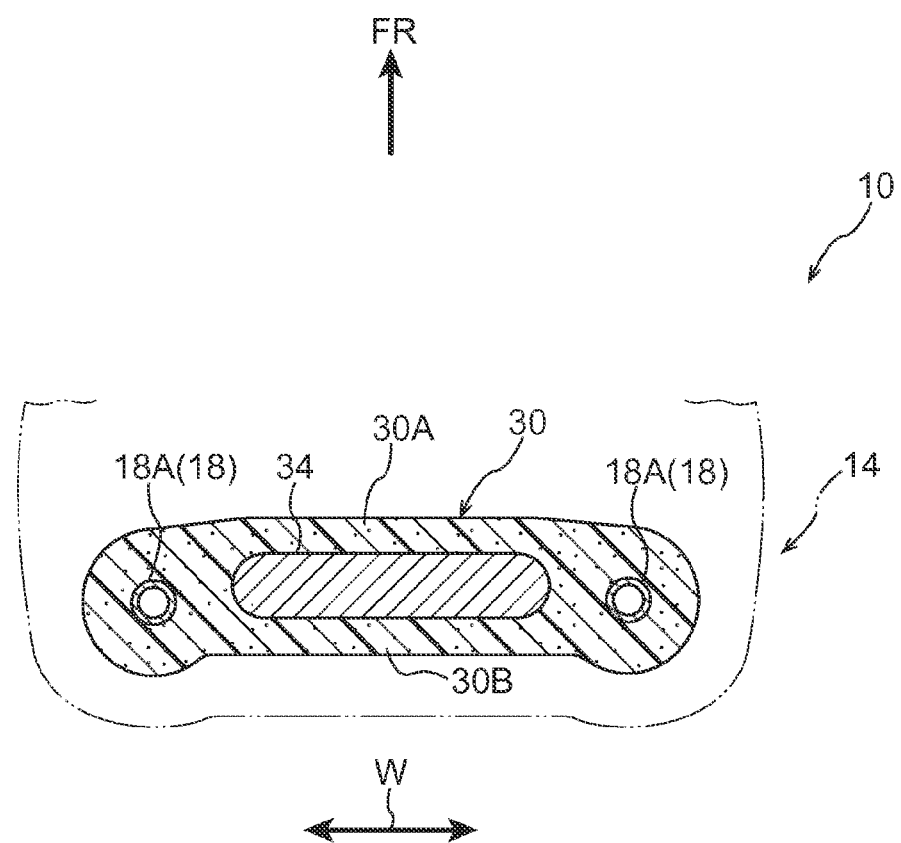
FIG. 3 is a cross-sectional view along line 3-3 of FIG. 1.

A cross-sectional view along line 3-3 of FIG. 1 is shown in FIG. 3. As shown in FIG. 1 through FIG. 3, the mass body 34 is made to be a round rod shaped (a solid cylindrical) member. Further, as shown in FIG. 1 and FIG. 3, the mass body 34 is disposed between the pair of left and right leg portions 18A of the headrest stay 18 with the length direction being the seat transverse direction, and is set at a position that overlaps the pair of the left and right leg portions 18A as seen in the seat side view shown in FIG. 2. Note that, in the present embodiment, the center of gravity (the center) of the mass body 34 overlaps the pair of left and right leg portions 18A as seen in a seat side view.

The projected surface area (see FIG. 1), as seen in a seat front view, of the portion of the mass body 34 which portion contacts the first urethane 30 is set to be larger than the projected surface area, as seen in a seat side view, of the aforementioned contacting portion. Therefore, at the first urethane 30, the rigidity, with respect to displacement in the seat longitudinal direction, of the mass body 34 is set to be higher than the rigidity, with respect to displacement in the seat transverse direction, of the mass body 34. In other words, at the mass body 34 that is supported by the first urethane 30, the resonance frequency in the seat longitudinal direction is set to be higher than the resonance frequency in the seat transverse direction.

Next, setting of the respective elastic coefficients at the first urethane 30 and the second urethane 32 that are shown in FIG. 1 and FIG. 2 is described hereinafter by using an example. In the present embodiment, as an example, a material having a higher elastic coefficient than the material of the first urethane 30 is used for the second urethane 32. Note that, the same material as the first urethane 30 may be used for the second urethane 32, and the foaming ratio of the second urethane 32 may be set to be lower than the foaming ratio of the first urethane 30. Further, the spring constant of the first urethane 30 is set to a spring constant that is optimal for addressing the NV in a case of assuming vibration at usual times, i.e., in a case in which the amplitude of the mass body 34 is less than a predetermined value (a region of small displacement). In contrast, the spring constant of the second urethane 32 is set to a spring constant that is optimal for addressing a rear collision in a case of assuming a collision, i.e., in a case in which the amplitude of the mass body 34 is greater than or equal to the predetermined value (a region of large displacement). By the way, the spring characteristic of the second urethane 32 may be set in consideration of a range of spring constants that are comfortable in cases of supporting the head portion of the vehicle occupant.

The volume of the second urethane 32 is set to be greater than the volume of the first urethane 30. Further, the second urethane 32 has a pair of front and rear second overlap portions 32A, 32B (see FIG. 2) that are set at positions overlapping the mass body 34 and the first overlap portion 30A as seen in a seat front view. In FIG. 2, the second overlap portion that is set at the seat front side of the mass body 34 and the first overlap portion 30A is indicated by reference numeral 32A, and the second overlap portion that is set at the seat rear side of the mass body 34 and the first overlap portion 30B is indicated by reference numeral 32B.

(Method of Manufacturing Headrest)

A method of manufacturing the headrest 14 is described next.

First, the resin cover 24 is mounted to the headrest stay 18. Next, the mass body 34 is set between the pair of leg portions 18A of the headrest stay 18, with respect to a stay assembly 26 that has the resin cover 24 and the headrest stay 18 that are shown in FIG. 1 (a first step). Next, due to the raw material of the first urethane 30 being supplied and foam-molded so as to connect the mass body 34 and the leg portions 18A at the sides thereof (first-stage foaming step), the mass body 34 is fixed to the leg portions 18A. Namely, in this step, by supplying the urethane, that is the raw material of the first urethane 30, and foam-molding the urethane at the outer peripheral side of the mass body 34, the mass body 34, and the regions of the leg portions 18A which regions are at the sides of the mass body 34, are connected by the first urethane 30 (second step).

Next, the headrest skin 22, that is in a state before being sewn at the sewn-together portion 22B shown in FIG. 2, is hung upside-down, and the stay assembly 26 is, in an upside-down posture, inserted into this headrest skin 22 from the upper side. Namely, in this step, the headrest stay 18 is inserted into the interior of the headrest skin 22 that is bag-shaped, and the first urethane 30 and the mass body 34 are disposed at the interior of the headrest skin 22 (third step). Then, the leg portions 18A of the headrest stay 18 are inserted through the stay insert-through holes 22A. In this state, due to the raw material of the second urethane 32 being injected and foam-molded in the interior of the headrest skin 22 (second-stage foaming step), the headrest pad 20 is formed. Namely, in this step, the headrest pad 20 is formed by the first urethane 30 and the second urethane 32 (fourth step), due to the urethane, that is the raw material of the second urethane 32 whose elastic coefficient is set to be higher than that of the first urethane 30, being injected into and foam-molded in the interior of the headrest skin 22. Finally, the headrest skin 22 is sewn at the sewn-together portion 22B.

In a case of applying such a method, the mass body 34 is fixed to the leg portions 18A in the first-stage foaming step (the second step). Therefore, in the second-stage foaming step (the fourth step), a situation in which the mass body 34 falls-out from its planned placement position, or the like, can be avoided.

(Operation/Effects)

Operation and effects of the above-described embodiment are described next.

In accordance with the structure of the present embodiment, the mass body 34 is supported by the first urethane 30 that is elastically deformable, at the inner side of the headrest skin 22 of the vehicle seat 10. Namely, a dynamic damper 28 that has the first urethane 30 and the mass body 34 is structured. Therefore, seat vibrations are suppressed by setting the frequency characteristic of the dynamic damper 28 such that the dynamic damper 28 works in the frequency band of seat vibrations for which suppression is desired.

Further, because the first urethane 30 covers the peripheral edge of the mass body 34 over the entire periphery thereof, setting of the frequency characteristic of the dynamic damper 28 is easy as compared with a structure in which, for example, the mass body (34) is covered by the first urethane (30) and the second urethane (32). Namely, seat vibrations are suppressed by setting the frequency characteristic of the dynamic damper 28 by adjusting the mass of the mass body 34 or the rigidity, the volume, the shape or the like of the first urethane 30, such that the dynamic damper 28 works in the frequency band of seat vibrations for which suppression is desired.

Here, in the present embodiment, the first urethane 30 has the first overlap portions 30A, 30B that are set at positions that overlap the mass body 34 as seen in a seat front view. Therefore, in cases in which the headrest 14 vibrates in the seat longitudinal direction at times when the seat vibrates usually, the mass body 34 is displaced while elastically deforming the first overlap portions 30A, 30B, and damps the vibrations.

Figure 4:
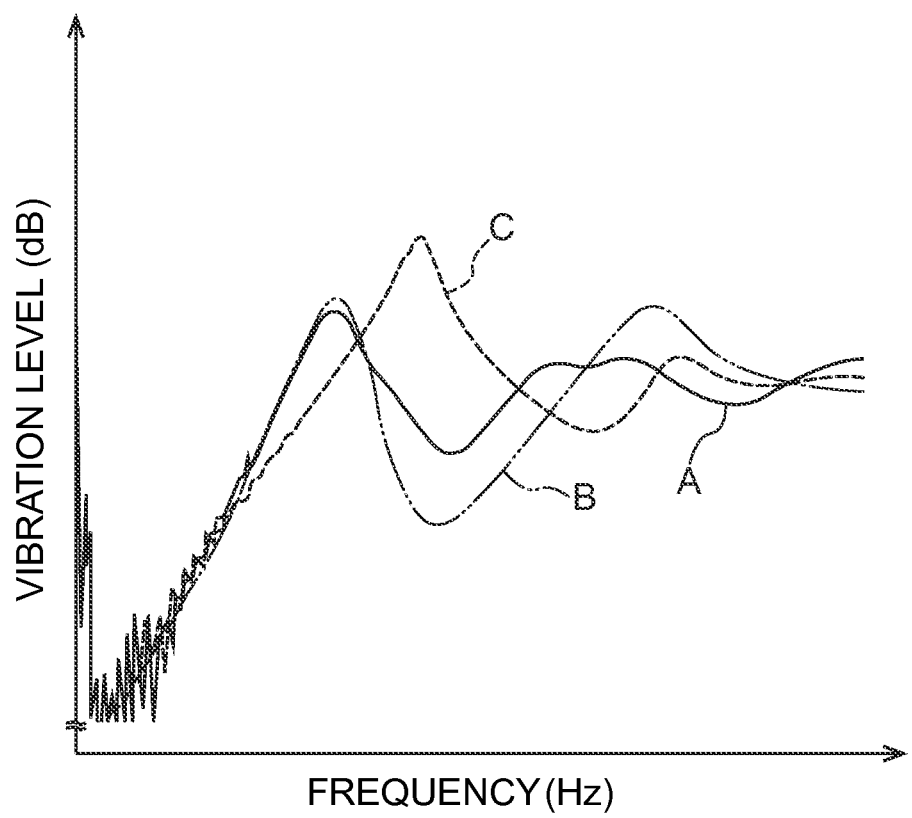
FIG. 4 is a graph showing the relationship between vibration level and frequency of the headrest of the vehicle seat relating to the first embodiment.

A graph comparing the NV performance in a case of applying the structure relating to the present embodiment and in a case of applying a comparative structure is shown in FIG. 4. Note that the magnitude of the vibration level is plotted on the vertical axis, and frequency is plotted on the horizontal axis. Solid line A shows the characteristic in a case in which the structure relating to the present embodiment is applied and the mass of the mass body is 250 g. In contrast, two-dot chain line B shows the characteristic in a case of applying a first comparative structure in which a mass body of 600 g is mounted to a headrest stay via a mounting bracket and a rubber body. Further, dashed line C shows the characteristic in a case of applying a second comparative structure in which a dynamic damper is not provided at the headrest. In the structure relating to the present embodiment, an NV performance that is equivalent to or better than that of the first comparative structure is obtained, regardless of the fact that the mass of the mass body is less than or equal to half of that of the first comparative structure.

On the other hand, the second urethane 32 that, together with the first urethane 30, structures the headrest pad 20 is disposed at the inner side of the headrest skin 22 shown in FIG. 2. The elastic coefficient of this second urethane 32 is set to be higher than that of the first urethane 30. Due thereto, non-linearization of the rigidity characteristic of the headrest pad 20 is obtained. Further, the spring characteristic of the first urethane 30 whose elastic coefficient is low contributes in the small displacement range in which the amplitude of the mass body 34 is less than a predetermined value (at the time of vibrating), whereas the spring characteristic of the second urethane 32 whose elastic coefficient is high contributes in the large displacement range in which the amplitude of the mass body 34 is greater than or equal to the predetermined value (at the time of a collision). Namely, at the time of a rear collision, due to the second urethane 32, the supporting rigidity of the headrest 14 with respect to the head portion of the vehicle occupant is increased, and the amplitude of the mass body 34 also is suppressed.

Further, the second urethane 32 has the second overlap portions 32A, 32B that are set at positions overlapping the mass body 34 and the first overlap portions 30A, 30B as seen in a seat front view. Therefore, in a case in which the thickness of the headrest 14 in the seat longitudinal direction has been determined in advance, the thicknesses of the first overlap portions 30A, 30B in the seat longitudinal direction can be made thinner by amounts corresponding to the amounts over which the second overlap portions 32A, 32B are provided. Further, in a case in which the mass body 34 starts to vibrate in the vehicle longitudinal direction at an amplitude that is greater than or equal to the amplitude at the time when the seat vibrates usually, the second overlap portions 32A, 32B suppress the vibration of the mass body 34. For these reasons, at the time of a rear collision, the amplitude of the mass body 34 in the seat longitudinal direction is effectively suppressed, and therefore, the load on the neck portion of the vehicle occupant, that is caused by vibrations of the mass body 34 in the seat longitudinal direction, is reduced.

The load to the neck portion of the vehicle occupant at the time of a rear collision is described further here. The smaller the difference between the acceleration that is applied to the head portion of a vehicle occupant and the acceleration that is applied to the chest portion, the smaller the load to the neck portion of the vehicle occupant at the time of a rear collision.

Examining the phenomena at the time of a rear collision, in the initial stage at the time when a vehicle sustains a rear collision, the headrest 14 is pushed-out, together with the seat back 12, toward the seat front side. At this time, the mass body 34 attempts to rest at its initial position due to inertia, and therefore, there becomes a state in which the first urethane 30 deforms and the mass body 34 is swung toward the seat rear side. Then, in a case in which the head portion of the vehicle occupant starts to be displaced toward the headrest 14 side due to the chest portion of the vehicle occupant being pushed by the seat back 12 and being displaced toward the seat front side, the greater the amplitude of the mass body 34 toward the seat rear side, the smaller the pushing force of the headrest 14 with respect to the head portion of the vehicle occupant. In other words, the difference between the acceleration that is applied to the head portion of the vehicle occupant and the acceleration that is applied to the chest portion becomes large, and the load to the neck portion of the vehicle occupant becomes large.

However, in the present embodiment, in a case in which the mass body 34 starts to vibrate toward the seat rear side at an amplitude that is greater than or equal to the amplitude at the time when the seat vibrates, the second urethane 32 (and the second overlap portion 32B in particular) effectively suppresses vibration of the mass body 34. Therefore, the pushing force (supporting force) of the headrest 14 with respect to the head portion of the vehicle occupant is ensured, and the difference between the acceleration that is applied to the head portion of the vehicle occupant and the acceleration that is applied to the chest portion also is suppressed, and therefore, the load to the neck portion of the vehicle occupant is reduced.

Further, because the second urethane 32 structures the outer peripheral portion of the headrest pad 20, at the time of a rear collision, deformation of the outer shape of the headrest pad 20 is suppressed, and the head portion of the vehicle occupant is supported by the second urethane 32 whose elastic coefficient is high. Due thereto, the supporting rigidity of the headrest 14 with respect to the head portion of the vehicle occupant increases.

Moreover, because the volume of the second urethane 32 is greater than the volume of the first urethane 30, at the time of a rear collision, the supporting rigidity of the headrest 14 with respect to the head portion of the vehicle occupant is increased, as compared with a case in which the volume of the second urethane 32 is less than the volume of the first urethane 30.

As described above, in accordance with the headrest 14 relating to the present embodiment and the vehicle seat 10 that is provided therewith, load to the neck portion of a vehicle occupant at the time of a rear collision can be reduced while the NV performance is ensured.

Further, in the present embodiment, the mass body 34 is disposed between the pair of left and right leg portions 18A of the headrest stay 18, and is set at a position that overlaps the pair of left and right leg portions 18A as seen in a seat side view. Therefore, at the time of a side collision, displacement of the mass body 34 in the seat transverse direction is suppressed.

Moreover, in the present embodiment, the headrest pad 20 (the first urethane 30 and the second urethane 32) is formed of urethane, and there is a structure in which the first urethane 30 is fixed to the headrest stay 18 by the adhesive force of the urethane itself. Therefore, fastening by bolts or the like is not needed in the setting of the mass body 34, and manufacturing is easy.

(Comparison with Comparative Structure)

Supplementary description is given here on the basis of other standpoints and in comparison with the comparative structure.

The comparative structure here is a structure in which a mass body (an iron mass or the like) is mounted to a headrest stay via a mounting bracket and a rubber body, and a stopper (a resin cover) for suppressing the amplitude of the mass body at the time of a collision is provided. Note that, in this comparative structure, the damping performance of the rubber body (elastic body) that is the spring element is inferior to that of the first urethane 30.

In this comparative structure, fastening bolts, a stopper, and the like are needed in addition to the mounting bracket, the rubber body, and the mass body. Therefore, there is a large number of parts in this comparative structure. In contrast, in the structure relating to the present embodiment, a mounting bracket, a rubber body, a mass body, fastening bolts, stoppers, and the like can be eliminated, and therefore, the number of parts can be reduced.

Further, there is a large number of assembly steps in the above-described comparative structure. Namely, in a method of manufacturing a headrest that is provided with the above-described comparative structure, a dynamic damper assembly that has the mounting bracket, the rubber body and the mass body is assembled, and next, the dynamic damper assembly is mounted to the headrest stay. Next, the stopper is mounted to the headrest stay, and thereafter, integral foaming is carried out. In contrast, in the method of manufacturing a headrest relating to the present embodiment, the mass body 34 is fixed to the headrest stay 18 in the first foaming step (the second step), and thereafter, the headrest pad 20 is formed in the second foaming step (the fourth step). Therefore, the number of assembly steps is reduced.

Further, in the above-described comparative structure, the damping performance of the rubber body is not necessarily high. Therefore, in order to obtain a vibration reducing effect of a given extent, a mass body whose mass is large to a given extent (as an example, an iron mass of 500 g or more) is needed. Therefore, materials costs also increase. In contrast, in the structure relating to the present embodiment, by making the first urethane 30, whose damping performance is better than the rubber body, be the spring element of the dynamic damper 28, a vibration reducing effect that is equivalent to that of the case of above-described comparative structure is obtained by a mass body whose mass is smaller than (as an example, is half of) the case of the above-described comparative structure.

As described above, in the above-described comparative structure, the number of parts and the number of assembly steps are large, and the materials costs are high, and therefore, the cost is high overall. In contrast, in the structure relating to the present embodiment, the number of parts, the number of assembly steps and the materials costs all are reduced, and therefore, costs are reduced.

Further, in the above-described comparative structure, in addition to the mass body, a mounting bracket, fastening bolts, a stopper, and the like are needed, and therefore, the mass increases overall. Further, in the above-described comparative structure, as described above, the mass of the mass body must be made to be large. For these reasons, the problem of an increase in mass also arises in the above-described comparative structure.

In contrast, in the structure relating to the present embodiment, a mounting bracket and fastening bolts are not needed in the mounting of the mass body 34, and a stopper is rendered unnecessary by the second urethane 32, and therefore, the mass can be decreased by that much. Further, because the first urethane 30 has a good damping performance, even if the mass of the mass body is suppressed, a vibration reducing effect that is equivalent to that of the above-described comparative structure can be obtained. Accordingly, in the structure relating to the present embodiment, an increase in mass can be suppressed.

Further, in the above-described comparative structure, because the damping performance of the rubber body is not necessarily good, this is a structure that is disadvantageous in suppressing the amplitude of the mass body in the seat longitudinal direction at the time of a rear collision. In contrast, in the structure relating to the present embodiment, in addition to the first urethane 30 whose damping performance is better than that of the rubber body, the second urethane 32 whose damping performance is even better is provided, and therefore, the amplitude of the mass body 34 in the seat longitudinal direction at the time of a rear collision is suppressed effectively.

Further, in the above-described comparative structure, because the dynamic damper is mounted to the headrest stay via the mounting bracket, a relatively large mounting space must be ensured in a vicinity of the headrest stay, and the mountability is poor. In contrast, in the structure relating to the present embodiment, the mass body 34 is fixed to the headrest stay 18 due to the raw material of the first urethane 30 being foam-molded, and therefore, the mountability is good. Further, in the structure relating to the present embodiment, in addition to being able to make the mass body 34 compact (light-weight), a mounting bracket, fastening bolts, a stopper and the like are not needed, and therefore, it suffices for the space that is needed to be relatively small.

Further, in the above-described comparative structure, the dynamic damper itself must be remade in order to set the frequency characteristic of the dynamic damper such that the dynamic damper works in the frequency band of the seat resonance that differs per vehicle type. In contrast, in the structure relating to the present embodiment, the frequency characteristic of the dynamic damper can be set if the material, the volume or the foamed ratio of the first urethane 30 is changed. Accordingly, in the structure relating to the present embodiment, tuning (optimal setting) is easy.

Further, in the above-described comparative structure, it is difficult to set frequency characteristics that differ in two or more directions among the seat longitudinal direction, the seat transverse direction (the left-right direction), the seat vertical direction, the torsion direction, and the like. This is because, in the above-described comparative structure, in a case in which the mass body hangs-down at the rubber body, it is difficult to make the rubber body have different rigidities in two or more directions. In contrast, in the structure relating to the present embodiment, spring constants, and accordingly, frequency characteristics, that respectively differ in each of two or more directions can be set by changing the shape of the mass body 34 (the shape and the surface area of the surface that contacts the first urethane 30) or the shape of the first urethane 30.

Further, in the above-described comparative structure, because the mass of the mass body must be made to be large, at the time of a rear collision, there is the possibility that the amplitude of the mass body in the seat longitudinal direction will become large. Therefore, in the above-described comparative structure, a stopper is provided separately. In contrast, in the structure relating to the present embodiment, the mass of the mass body 34 can be suppressed as compared with the above-described comparative structure, and therefore, at the time of a rear collision, the amplitude of the mass body in the seat longitudinal direction is suppressed.

Further, in the above-described comparative structure, the need to make the thickness of the headrest in the seat longitudinal direction thick arises, due to increased weight of the mass body, and the placement of the mounting bracket and the stopper, and the like. In contrast, in the structure relating to the present embodiment, such a need does not arise.

Second Embodiment

Figure 5:
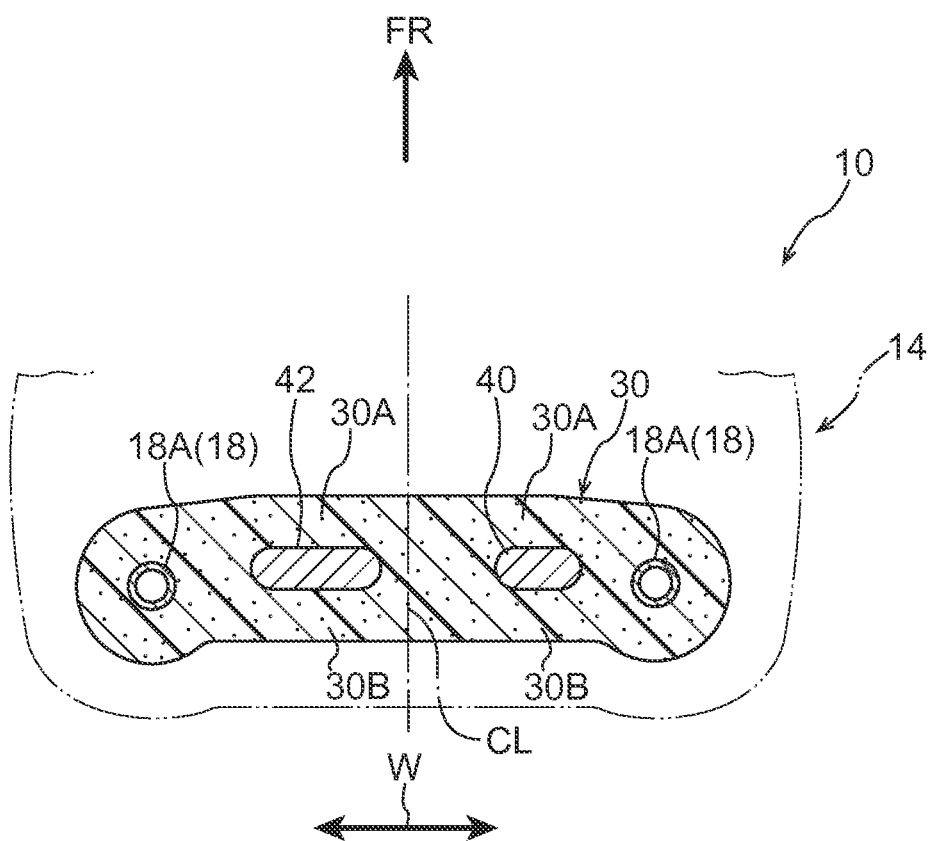
FIG. 5 is a cross-sectional view showing, in a cross-section corresponding to FIG. 3, a portion of the headrest of the vehicle seat relating to a second embodiment.

A headrest and a vehicle seat provided therewith relating to a second embodiment of the present invention are described next by using FIG. 5 through FIG. 7. A cross-sectional view corresponding to FIG. 3 of the first embodiment is shown in FIG. 5. As shown in this drawing, the present embodiment has a feature in the arrangement of mass bodies 40, 42, and the other structures thereof are structures that are similar to the first embodiment. Accordingly, structural portions that are similar to the first embodiment are denoted by the same reference numerals, and description thereof is omitted.

As shown in FIG. 5, the plural (two in the present embodiment) mass bodies 40, 42 are embedded in the first urethane 30. Namely, the respective peripheral edges of the plural mass bodies 40, 42 are covered over the entire peripheries thereof by the first urethane 30, and are supported by the first urethane 30. The mass bodies 40, 42 are disposed so as to be lined-up apart at the left and right both sides in the seat transverse direction with respect to a seat transverse direction central line CL at the headrest 14.

The respective resonance frequencies of the mass bodies 40, 42 that are supported by the first urethane 30 differ. Concretely, in the present embodiment, by setting the mass of the mass body 42 to be larger than the mass of the mass body 40, the resonance frequency of the mass body 42 is set to be lower than the resonance frequency of the mass body 40.

The mass bodies 40, 42 are made to be round rod shaped (solid cylindrical) members, and are disposed between the pair of left and right leg portions 18A of the headrest stay 18 with the length directions thereof being the seat transverse direction, and are set at positions overlapping the pair of the left and right leg portions 18A as seen in a seat side view. In the present embodiment, the centers of gravity (the centers) of the mass bodies 40, 42 overlap the pair of left and right leg portions 18A as seen in a seat side view. Further, in the present embodiment, the mass body 40 that is light is set slightly toward the outer side in the seat transverse direction, and the mass body 42 that is heavy is set toward the center in the seat transverse direction, so that the center of gravity position of the headrest 14 does not tend toward the left or the right.

The structure of the present embodiment can be said to be a structure having a main vibration system in which a seat skeleton portion of the vehicle seat that is disposed at the vehicle floor is the spring and the entire headrest 14 is the mass, and plural dynamic dampers having a spring and a mass at the headrest 14.

Also in accordance with the structure of the present embodiment that is described above, operation and effects that are similar to the above-described first embodiment are obtained. Further, because the plural mass bodies 40, 42 are disposed, the mass per each of the mass bodies 40, 42 can be made to be small. Due thereto, at the time of a rear collision, the amplitudes of the respective mass bodies 40, 42 in the seat longitudinal direction are suppressed due to the lowering of the inertial forces of the respective mass bodies 40, 42. Accordingly, load to the neck portion of the vehicle occupant, that is caused by vibrations of the mass bodies 40, 42 in the seat longitudinal direction, is reduced. Further, because the respective resonance frequencies of the mass bodies 40, 42 differ, the frequency band of seat vibrations that can be suppressed can be broadened. Note that the headrest 14 relating to the present embodiment can be manufactured by a manufacturing method that is similar to the manufacturing method of the headrest 14 relating to the first embodiment.

Note that, as a modified example of the present embodiment, the respective resonance frequencies of the mass bodies may be set to different values by making the masses of the two mass bodies that are supported by the first cushion material be the same and changing the elastic coefficients of the regions that support the respective mass bodies. In order to change the elastic coefficients of the regions that support the respective mass bodies, for example, it suffices to change the surface areas of contact between the first cushion material and the respective mass bodies.

Figure 6:
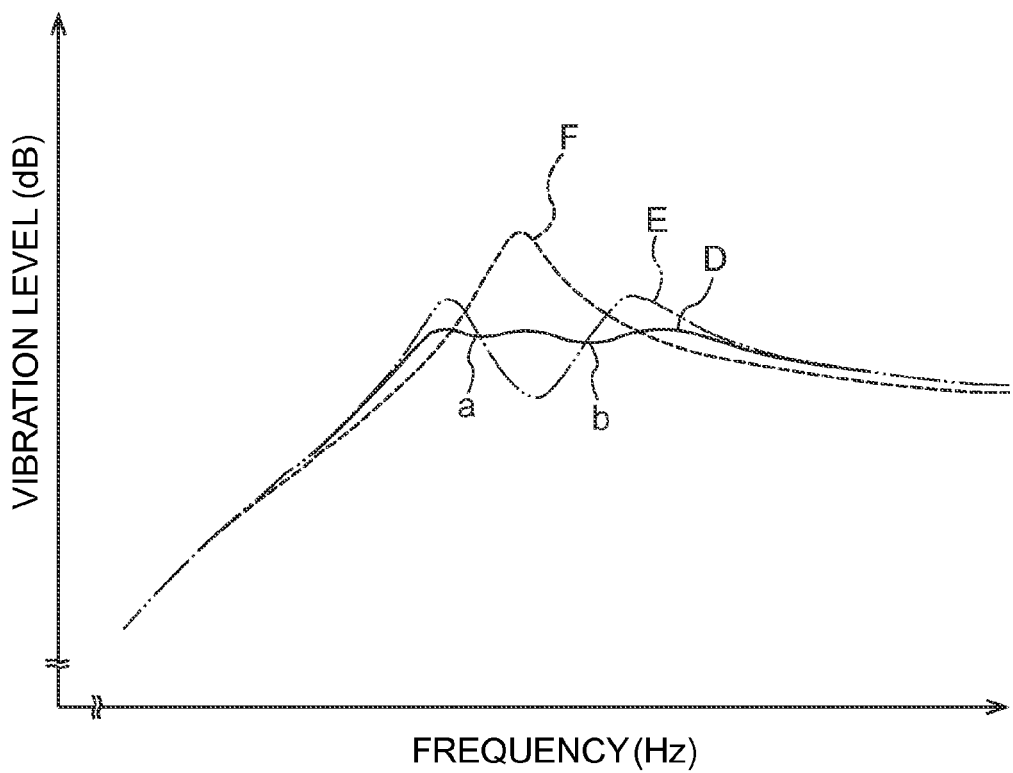
FIG. 6 is a graph showing the relationship between vibration level and frequency of the headrest of the vehicle seat relating to a modified example of the second embodiment.

A graph that compares the NV performance, in a case of applying the structure relating to the above-described modified example of the present embodiment and in a case of applying the comparative structure, is shown in FIG. 6. Note that the magnitude of the vibration level is plotted on the vertical axis, and frequency is plotted on the horizontal axis. Solid line D shows the characteristic in a case in which the above-described modified example is applied, and point a and point b are the resonance frequencies of the respective mass bodies that have been set to be different from one another. In contrast, two-dot chain line E shows the characteristic in a case in which the structure relating to the first embodiment is applied. Note that the mass of the mass body in the structure whose characteristic is shown by the two-dot chain line E is equal to the sum of the respective mass bodies of the structure whose characteristic is shown by the solid line D. Further, dashed line F shows the characteristic in a case in which a structure in which a dynamic damper is not provided at the headrest is applied. The structure relating to the modified example of the second embodiment has an improved NV performance even when compared with the structure relating to the first embodiment.

Figure 7:
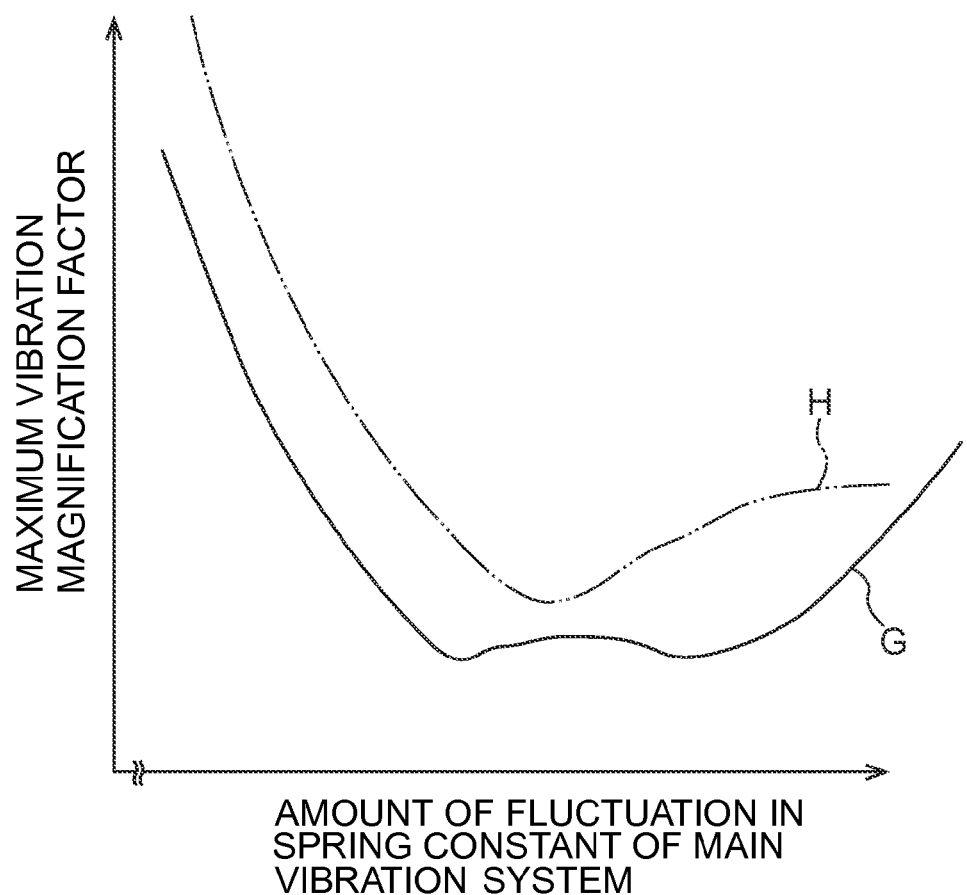
FIG. 7 is a graph showing the relationship between maximum vibration magnification factor and amount of fluctuation in the spring constant of a main vibration system of the vehicle seat relating to the modified example of the second embodiment.

A graph that compares the robustness in a case of applying the structure relating to the above-described modified example of the present embodiment and in a case of applying the comparative structure, is shown in FIG. 7. Note that the maximum vibration magnification factor is plotted on the vertical axis, and the amount of fluctuation in the spring constant of the main vibration system (the seat skeleton portion of the vehicle seat) is plotted on the horizontal axis. Solid line G shows the characteristic in the case in which the above-described modified example (a structure that is the same as the structure whose characteristic is shown by the solid line D of FIG. 6) is applied. In contrast, two-dot chain line H shows the characteristic in the case in which the structure relating to the first embodiment (a structure that is the same as the structure whose characteristic is shown by the two-dot chain line E of FIG. 6) is applied. In the structure relating to the modified example of the second embodiment, the region in which the maximum vibration magnification factor is low is broad, and the robustness of the amplitude level reducing effect is high, as compared with the structure relating to the first embodiment.

Further, in accordance with the structure relating to the present embodiment that is shown in FIG. 5, the mass bodies 40, 42 are disposed so as to be lined-up apart at the left and right both sides in the seat transverse direction with respect to the seat transverse direction central line CL at the headrest 14. Therefore, when, at the time of a rear collision, the head portion of the vehicle occupant is pushed-against the headrest 14 and is displaced toward between the left and right mass bodies 40, 42, the mass bodies 40, 42 can be displaced toward the vehicle transverse direction outer sides.

Supplementary Description of Embodiments

Note that, as a modified example of the first and second embodiments, the entirety of the mass body may be set at a position that overlaps the pair of left and right leg portions as seen in a seat side view. Although a portion of the mass body is set at a position that overlaps the pair of left and right leg portions as seen in a seat side view, the center of gravity (the center) of the mass body can also be set so as to not overlap the pair of left and right leg portions as seen in a seat side view. Moreover, a structure in which the mass body is set at a position that does not overlap the pair of left and right leg portions as seen in a seat side view (a concrete example thereof is described later) also can be employed.

Figure 8:
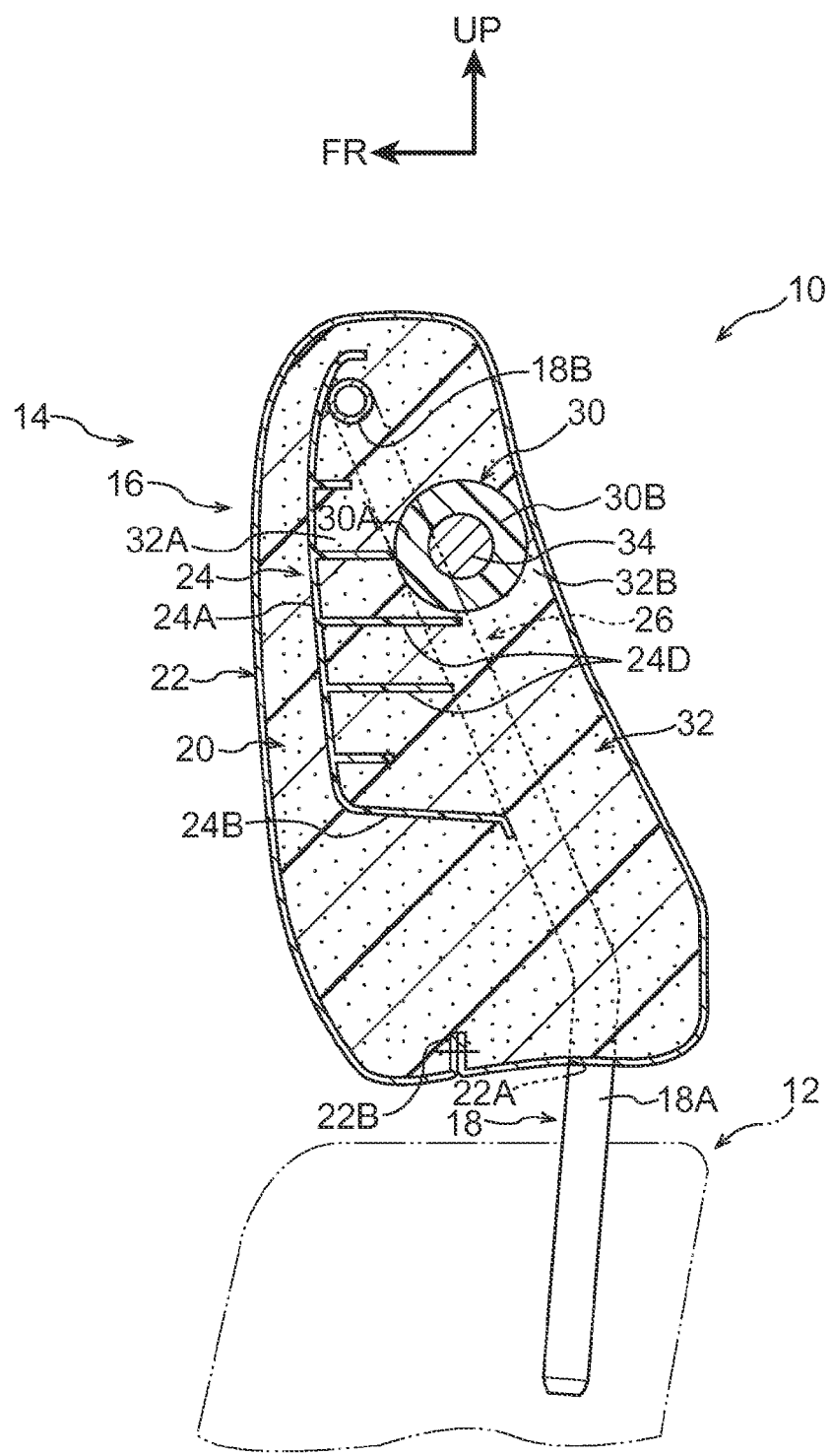
FIG. 8 is a cross-sectional view showing, in a seat side cross-section, the headrest of the vehicle seat relating to a modified example.

Further, as shown in the modified example of FIG. 8, a portion of or all of the mass body 34 may be disposed at the seat rear side of the resin cover 24. In accordance with such a structure, even if the mass body 34 starts to be displaced toward the seat front side at the time of a rear collision, this displacement is impeded by the resin cover 24. Note that, instead of the resin cover 24 of the above-described embodiments and the modified example of FIG. 8, for example, a resin cover, at which a hollow space is formed at the interior thereof in a state in which the resin cover is attached to the headrest stay, may be applied, or there may be a structure in which the headrest pad is not set in the inner side of a resin pad.

Further, as another modified example, a portion of or all of the mass body may be disposed at the seat rear side of the connecting portion (the upper end portion) of the headrest stay. In such a structure, even if the mass body starts to be displaced toward the seat front side at the time of a rear collision, this displacement is impeded by the connecting portion of the headrest stay. Note that, in this modified example, it is preferable that the center of gravity (the center) of the mass body overlap the connecting portion of the headrest stay as seen in a seat rear view.

Further, the mass body may be disposed at the seat rear side of the leg portions of the headrest stay. In such a structure, even if the mass body starts to be displaced toward the seat front side at the time of a rear collision, this displacement is impeded by the leg portions of the headrest stay. Further, in this structure, regardless of which position the headrest stay is disposed at, manufacturing is easy, and it is also easy to ensure the NV performance.

Further, the mass body may be disposed at the seat upper side of the connecting portion (the upper end portion) of the headrest stay. In such a structure, it is easy to ensure the amplitude of the mass body, and therefore, it is easy to obtain the effect as a dynamic damper. Further, the shape of the mass body may be made to be an arcuate columnar shape, and this mass body may be disposed so as to span over respective areas that are the seat upper side, the seat rear side and the seat lower side, with respect to the connecting portion (the upper end portion) of the headrest stay.

Further, in the above-described second embodiment, as shown in FIG. 5, the mass bodies 40, 42 are disposed so as to be lined-up apart at the left and right both sides in the seat transverse direction with respect to the seat transverse direction central line CL at the headrest 14. However, for example, plural mass bodies may be disposed so as to be separated vertically. In such a structure as well, the inertial force of each mass body can be made to be small, and therefore, the displacement of the mass bodies at the time of a rear collision is suppressed.

Further, as a modified example of the above-described second embodiment, the respective resonance frequencies of the mass bodies may be set to different values by making the masses of the mass bodies be the same and changing the elastic coefficients of the regions that support the respective mass bodies.

Further, in a structure in which the resin cover 24 (see FIG. 2 and the like) is not provided, the mass body may be disposed at the seat front side of the headrest stay. In such a structure, the mass body performs the function of the resin cover, and the supporting rigidity in a case in which the vehicle occupant supports his/her head portion on the headrest is high, and therefore, this relates to an improvement in the product marketability.

Further, resin covers may be disposed at the seat front side and the seat rear side of the headrest stay, and the mass body may be disposed between the front and rear resin covers. In such a structure, even if the mass body starts to be displaced greatly in the seat longitudinal direction at the time of a rear collision and at the time of a front collision (hereinafter called at "at the time of a front collision"), the displacement is impeded by either of the front and rear resin covers.

Further, with regard to the joining of the mass body and the first cushion material, the first cushion material may be joined over the entire periphery of the peripheral edge of the mass body as in the above-described embodiments, or the first cushion material may be joined at a portion of the peripheral edge of the mass body. In the case of the former, manufacturing is easy, and it is also easy to stabilize the damping performance. In the case of the latter, the spring constant can be lowered, and an improvement in performance due to lowering of the spring constant also is possible.

Here, aspects of joining of the mass body and the first cushion material are supplementarily described. A structure that joins only the seat upper side of the mass body to the first cushion material is easy to manufacture. Further, in a structure that joins only the seat front side of the mass body to the first cushion material, the mass body peeling-away from the first cushion material at the time of a rear collision and starting to be displaced toward the seat front side can be prevented or effectively suppressed. On the other hand, in a structure that joins only the seat rear side of the mass body to the first cushion material, the mass body peeling-away from the first cushion material at the time of a front collision and starting to be displaced toward the seat rear side can be prevented or effectively suppressed. Moreover, in a structure that joins only the seat lower side of the mass body to the first cushion material, the mass body peeling-away from and falling-off of the first cushion material due to gravity can be prevented or effectively suppressed.

Further, as a method for joining only a portion of the mass body, for example, it suffices to, in a state in which a cloth body covers a portion of the mass body, supply the raw material of the first urethane (the first cushion material) to the periphery of the mass body and integrally foam the material, and thereafter, pull the cloth body off and remove it from the outer periphery of the mass body. In this method, at the portion that was covered by the cloth body, the mass body and the first urethane (the first cushion material) are not joined, and a gap is formed between the both. Note that the aforementioned cloth body does not have to be pulled-off, and, instead of the aforementioned cloth body, felt, paper, a seal, or the like may be applied. Further, in a state in which a portion of the mass body is grasped by tweezers (a tool), the raw material of the first urethane (the first cushion material) may be supplied to the periphery of the mass body and foamed integrally, and thereafter, the tweezers may be pulled-away and removed from the outer periphery of the mass body.

Further, as another method for joining only a portion of the mass body, oil, wax or the like may be coated on the portion of the mass body that is not to be joined, and thereafter, the raw material of the first urethane (the first cushion material) may be supplied to the periphery of the mass body and foamed integrally. With this method, the manufacturing steps can be simplified and the materials costs also can be reduced, as compared with a method using a cloth body or the like. Further, in a case of carrying out manufacturing by this method, a portion of the mass body and the first urethane (the first cushion material) are in a state of contacting without being joined. At the region that is in a state of contact without being joined, spring force in the shearing direction does not work, but spring force in a compressing direction works even with respect to minute vibrations.

Further, it suffices for the specific gravity of the mass body to be greater than the that of the first cushion material at the periphery thereof. For example, iron, lead, rubber, a resin mass, a sandbag, a water bag, an oil bag, a mechanical part such as a motor or the like, or the like, can be utilized as the mass body. In a case of utilizing iron or lead as the mass body, because the specific gravity thereof is high, the mass body can be made to be compact. Further, iron and lead also have the advantage of being inexpensive. In a case of utilizing rubber or a resin mass as the mass body, even if the mass body is displaced toward the vehicle occupant side, the load to the vehicle occupant can be made to be small. In a case of utilizing a sandbag, a water bag or an oil bag as the mass body, because these have good damping characteristics, they are advantageous in ensuring the NV performance and in reducing the load to the neck portion of the vehicle occupant at the time of a rear collision. Moreover, in a case of utilizing a mechanical part (e.g., a motor for operating the headrest and the peripheral parts thereof, or the like) as the mass body, additional parts are unnecessary, and therefore, an increase in mass is suppressed. Note that a mechanical part for an active headrest, a motor for operating the headrest vertically and longitudinally, a blower fan, a resin cover (a part that relates to improving the sensation of rigidity in a case of supporting the rear head portion side of the vehicle occupant), and the like are examples of the mechanical part.

Further, in the above-described embodiments, the shapes of the mass bodies 34, 40, 42 that are shown in FIG. 3 and FIG. 5 and the like are made to be round rod shapes (solid cylindrical shapes). However, the shape of the mass body may be another shape such as, for example, cylindrical tube shaped (pipe shaped), spherical, plate-shaped, parallelepiped, half-cylindrical tube shaped (arcuate column shaped), or the like.

Further, as a reference example that is a modified example of the above-described embodiments but is not the present invention, at least one of the first cushion material and the second cushion material may be made to be another cushion material such as, for example, a resin foamed body other than urethane, or felt, rubber, or the like.

Further, as a modified example of the above-described embodiments, a portion of the peripheral edge of the mass body may be covered by the first cushion material, and another portion of the peripheral edge of this mass body may be covered by the second cushion material.

Further, as a modified example of the above-described embodiments, the first cushion material may have a first overlap portion that overlaps the mass body as seen in a seat front view, at only either one of the seat front side and the seat rear side with respect to the mass body. Further, a structure in which the first cushion material does not overlap the mass body as seen in a seat front view also can be employed. Moreover, the second cushion material may have a second overlap portion that overlaps the mass body and the first overlap portion as seen in a seat front view, at only either one of the seat front side and the seat rear side with respect to the mass body and the first overlap portion. Further, a structure in which the second cushion material does not overlap the mass body and the first overlap portion as seen in a seat front view also can be employed.

Further, as a modified example of the above-described embodiments, the first cushion material does not have to be embedded in the second cushion material. Namely, for example, the first cushion material and the second cushion material may be lined-up in the seat longitudinal direction or the seat vertical direction. Further, a structure in which the second cushion material is embedded in the first cushion material also can be employed. Moreover, as a modified example of the above-described embodiments, it is also possible to set the volume of the first cushion material to be greater than or equal to the volume of the second cushion material.

Further, as a modification of the above-described embodiments, the shape of the headrest stay 18 may be another shape such as, for example, an H-shape as seen in a seat front view, or the like.

Further, as a modified example of the above-described second embodiment, it is also possible to set the respective resonance frequencies of the mass bodies, that are supported by the first cushion material, to be the same.

Moreover, the concept of "covers an entire periphery of a peripheral edge of the mass body" that is recited in the third aspect of the present invention includes cases in which the peripheral edges of the mass bodies 34, 40, 42 are covered over the entire peripheries thereof as in the above-described embodiments, and in addition, also includes cases in which, although the peripheral edge of the mass body is covered over substantially the entire periphery thereof, portions that are not covered locally exist, and it cannot be strictly said that the peripheral edge of the mass body is covered over the entire periphery thereof, but that can obtain operation/effects that are similar to those of cases in which the peripheral edge of the mass body is covered over the entire periphery thereof and can be interpreted as substantially the entire periphery of the peripheral edge of the mass body being covered.

Note that the above-described embodiments and above-described plural modified examples can be implemented by being combined appropriately. Further, among the headrests that relate to the respective modified examples and headrests in which the above-described embodiments and above-described plural modified examples are combined appropriately, headrests, to which a manufacturing method that is similar to the method of manufacturing the headrest 14 relating to the first embodiment can be applied, may be manufactured by a manufacturing method that is similar to the method of manufacturing the headrest 14 relating to the first embodiment.

Examples of the present invention have been described above, but the present invention is not limited to the above, and, other than the above, can of course be embodied by being modified in various ways within a scope that does not depart from the gist thereof.

Note that the disclosure of Japanese Patent Application No. 2012-211328 is, in its entirety, incorporated by reference into the present Description.

The invention claimed is:

1. A headrest comprising:
a headrest stay that has leg portions supported at a seat back, the leg portions extending in a seat height direction;
a first cushion material that is covered by a headrest skin on an inner side of the headrest skin, the first cushion material supporting a mass body and being formed of an elastically deformable urethane, the first cushion material being fixed to the headrest stay by an adhesive force of the elastically deformable urethane on the leg portions of the headrest stay; and
a second cushion material that is covered by the headrest skin on the inner side of the headrest skin, the first cushion material and the second cushion material forming a headrest pad within the headrest skin, the second cushion material being formed of a urethane having a higher elastic coefficient than the first cushion material.

2. The headrest of claim 1, wherein:
the first cushion material has a first overlap portion that is set at a position that overlaps the mass body as seen in a seat front view of the seat back in a seat longitudinal direction of the seat back; and
the second cushion material has a second overlap portion that is set at a position that overlaps the mass body and the first overlap portion as seen in the seat front view of the seat back.

3. The headrest of claim 1, wherein the first cushion material covers an entire periphery of a peripheral edge of the mass body.

4. The headrest of claim 1, wherein the first cushion material is embedded in the second cushion material.

5. The headrest of claim 1, wherein a volume of the second cushion material is set to be greater than a volume of the first cushion material.

6. The headrest of claim 1, wherein:
the leg portions are provided as a left/right pair at the headrest stay; and
the mass body is disposed between the pair of left and right leg portions, the mass body being set at a position that overlaps the pair of left and right leg portions as seen in a seat side view of the seat back in a seat transverse direction of the seat back.

7. The headrest of claim 1, further comprising a plurality of bodies.

8. The headrest of claim 7, wherein respective resonance frequencies of the plurality of mass bodies are supported by the first cushion material differ.

9. The headrest of claim 7, wherein the plurality of mass bodies are disposed so as to be lined-up apart at both left and right sides in a seat transverse direction of the seat back with respect to a seat transverse direction central line of the headrest.

10. A vehicle seat comprising:
a seat cushion for a vehicle occupant to sit;
a seat back that is supported at a rear end portion of the seat cushion; and
the headrest of claim 1 that is disposed at an upper end portion of the seat back, the headrest of claim 1 for supporting a head portion of the vehicle occupant.

11. A method of manufacturing a headrest, the method comprising:
a first step of setting a mass body between a pair of leg portions of a headrest stay;
a second step of, after the first step, connecting the mass body to the leg portions at respective mass body sides of the leg portions by a first cushion material disposed at an outer peripheral side of the mass body, the mass body being connected to the respective mass body sides of the leg portions by supplying and foam-molding a first urethane, which is a raw material of the first cushion material;
a third step of, after the second step, inserting the headrest stay, the first cushion material, and the mass body into an interior of a headrest skin such that the headrest skin covers the headrest stay, the first cushion material, and the mass body;
a fourth step of, after the third step, forming a headrest pad within the headrest skin that includes the first cushion material and a second cushion material by injecting and foam-molding a second urethane, the second urethane being a raw material of the second cushion material having an elastic coefficient that is higher than an elastic coefficient of the first cushion material.

* * * * *